United States Patent
Boshoff (10) Patent No.: US 10,048,839 B2
(45) Date of Patent: Aug. 14, 2018

(54) HIERARCHY NAVIGATION IN A USER INTERFACE

(71) Applicant: Flow Labs, Inc., Menlo Park, CA (US)

(72) Inventor: Hendrik Frans Verwoerd Boshoff, Stellenbosch (ZA)

(73) Assignee: Flow Labs, Inc., Menlo Park, CA (US)

( * ) Notice: Subject to any disclaimer, the term of this patent is extended or adjusted under 35 U.S.C. 154(b) by 0 days.

(21) Appl. No.: 15/544,127

(22) PCT Filed: Jan. 22, 2016

(86) PCT No.: PCT/IB2016/050314
§ 371 (c)(1),
(2) Date: Jul. 17, 2017

(87) PCT Pub. No.: WO2016/116891
PCT Pub. Date: Jul. 28, 2016

(65) Prior Publication Data
US 2018/0024706 A1      Jan. 25, 2018

(30) Foreign Application Priority Data
Jan. 22, 2015   (ZA) .................................. 2015/00447

(51) Int. Cl.
*G06F 3/00*       (2006.01)
*G06F 3/0482*    (2013.01)
(Continued)

(52) U.S. Cl.
CPC ........ *G06F 3/0482* (2013.01); *G06F 3/04845* (2013.01); *G06F 3/04883* (2013.01)

(58) Field of Classification Search
CPC combination set(s) only.
See application file for complete search history.

(56) References Cited

U.S. PATENT DOCUMENTS 6,128,016 A    10/2000  Goelho et al.
9,007,302 B1 *  4/2015  Bandt-Horn .......... G06F 3/0202
                                                        345/156
(Continued)

OTHER PUBLICATIONS

Patent Cooperation Treaty, International Search Report, International Patent Application No. PCT/IB2016/050314, dated May 17, 2016, 3 Pages.

(Continued)

*Primary Examiner* — Hien L Duong
(74) *Attorney, Agent, or Firm* — Fenwick & West LLP (57) ABSTRACT

A method of navigating a tree structure in a user interface is provided. A node set is displayed on the user interface, and includes a central node representing a parent node and child nodes arranged around it. Movement and/or position of a pointer is tracked. As the pointer is moved towards a child node, grandchild nodes are rendered and enlarged within the target child node until they fill the area of the target child node. At the same time, the area of the target child node around the central node relative to the other child nodes is enlarged. Once the pointer has crossed a first selection threshold at a threshold point, the grandchild nodes have completely filled the area of the target child node, and the central node is surrounded by the grandchild nodes so as to represent the target child node. In this manner, a tree structure may be continuously navigated through movement of the pointer.

16 Claims, 8 Drawing Sheets

(51) Int. Cl.
*G06F 3/0484* (2013.01)
*G06F 3/0488* (2013.01)

(56) References Cited

U.S. PATENT DOCUMENTS

| | | | | |
|---|---|---|---|---|
| 9,383,905 B1* | 7/2016 | Kumar | | G06F 3/048 |
| 2002/0113816 A1 | 8/2002 | Mitchell et al. | | |
| 2005/0273730 A1 | 12/2005 | Card et al. | | |
| 2006/0095865 A1* | 5/2006 | Rostom | | G06F 3/0482 |
| | | | | 715/810 |
| 2007/0180392 A1* | 8/2007 | Russo | | G06F 3/0482 |
| | | | | 715/765 |
| 2008/0307369 A1* | 12/2008 | Liu | | G06T 11/206 |
| | | | | 715/855 |
| 2010/0306702 A1* | 12/2010 | Warner | | G06F 3/04817 |
| | | | | 715/811 |
| 2010/0333030 A1* | 12/2010 | Johns | | G06F 3/048 |
| | | | | 715/834 |
| 2011/0047014 A1* | 2/2011 | De Angelo | | G06F 3/0482 |
| | | | | 705/14.4 |
| 2011/0055760 A1* | 3/2011 | Drayton | | G06F 3/0482 |
| | | | | 715/834 |
| 2011/0066981 A1* | 3/2011 | Chmielewski | | G06F 3/0482 |
| | | | | 715/834 |
| 2012/0079427 A1* | 3/2012 | Carmichael | | G06F 3/04817 |
| | | | | 715/825 |
| 2012/0226978 A1* | 9/2012 | Harberts | | G06F 3/0482 |
| | | | | 715/702 |
| 2012/0240064 A1* | 9/2012 | Ramsay | | G06T 11/00 |
| | | | | 715/762 |
| 2013/0019175 A1* | 1/2013 | Kotler | | G06F 3/0482 |
| | | | | 715/728 |
| 2013/0019182 A1* | 1/2013 | Gil | | G06F 3/0482 |
| | | | | 715/738 |
| 2013/0019206 A1* | 1/2013 | Kotler | | G06F 3/04812 |
| | | | | 715/834 |
| 2013/0104079 A1* | 4/2013 | Yasui | | G06F 3/0482 |
| | | | | 715/834 |
| 2013/0117280 A1 | 5/2013 | Donaldson et al. | | |
| 2013/0132904 A1* | 5/2013 | Primiani | | G06F 3/048 |
| | | | | 715/834 |
| 2013/0212529 A1* | 8/2013 | Amarnath | | G06F 3/017 |
| | | | | 715/810 |
| 2013/0339904 A1* | 12/2013 | Geithner | | G06F 3/0482 |
| | | | | 715/834 |
| 2014/0071063 A1* | 3/2014 | Kuscher | | G06F 3/041 |
| | | | | 345/173 |
| 2014/0075388 A1* | 3/2014 | Kuscher | | G06F 3/0482 |
| | | | | 715/834 |
| 2014/0195979 A1* | 7/2014 | Branton | | G06F 3/0488 |
| | | | | 715/834 |
| 2014/0258844 A1 | 9/2014 | Liao et al. | | |
| 2014/0298268 A1* | 10/2014 | Kang | | G06F 3/04847 |
| | | | | 715/841 |
| 2015/0370427 A1* | 12/2015 | Zhang | | G06F 3/04817 |
| | | | | 715/835 |
| 2016/0026345 A1* | 1/2016 | Yao | | G06F 3/0488 |
| | | | | 715/815 |
| 2016/0147433 A1* | 5/2016 | Lin | | G06F 3/04883 |
| | | | | 715/834 |

OTHER PUBLICATIONS

Patent Cooperation Treaty, Written Opinion of the International Searching Authority, International Patent Application No. PCT/IB2016/050314, dated May 17, 2016, 6 Pages.

* cited by examiner

HIERARCHY NAVIGATION IN A USER INTERFACE

CROSS-REFERENCE TO RELATED APPLICATIONS

This application is a 35 U.S.C. 371 national stage filing of International Application No. PCT/IB2016/050314, filed on 22 Jan. 2016, which claims priority to South African provisional patent application number 2015/00447 filed on 22 Jan. 2015, which are incorporated by reference herein.

FIELD OF THE INVENTION

This invention relates to hierarchy navigation in a user interface. More particularly, the invention relates to a method of continuously and recursively navigating a tree structure in a user interface.

BACKGROUND TO THE INVENTION

In many electronic devices, such as mobile phones, tablet computers, personal computers, televisions, or the like, a user interface is provided to receive user input and control a display of the electronic device so as to allow a user to interact with the electronic device and its associated content.

Users may use user interfaces displayed on electronic devices to navigate to a particular node arranged in a tree or other hierarchical structure. A node arranged in a tree structure may have a single parent node of a preceding level associated therewith and may also have a plurality of child nodes of a succeeding level associated therewith.

As one example, a user may wish to use the user's electronic device to navigate to a particular product included in a product catalogue provided by an e-commerce merchant. Further examples include navigating a file system of a personal computer, or browsing a music library stored on a mobile phone.

Known user interfaces may provide the user with controls to discretely jump between levels of a hierarchical structure. Such controls typically require the user to navigate or scroll through many nodes before the user locates the node which the user is looking for. In some cases, the user may incorrectly navigate to a node thinking that children of that node will be of interest, only to find that they are not. In other cases where a user is not sure where to find a particular node of interest, the user may have to navigate into and then out of various nodes until the user finds the node of interest.

Existing user interfaces may not adequately deal with the problem of efficiently navigating tree structures at least for the reasons set out above. Therefore, users of electronic devices may waste time in, and become frustrated with, navigating hierarchical structures.

The present invention aims to alleviate these and other problems, at least to some extent.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with a first aspect of the invention there is provided a method of navigating a tree structure in a continuous motion, the method being conducted in a user interface and comprising:

displaying a node set, the node set including a central node and a plurality of child nodes arranged substantially around the central node, the central node representing a parent associated with a first level of the tree structure and the child nodes representing children of the parent associated with a second level of the tree structure, wherein the central node is associated with a first anchor point which is substantially bound by a first selection threshold;

tracking the movement and/or position of a pointer in relation to the anchor point; and during a continuous motion of the pointer which commences in the central node and is directed substantially towards a target child node, as the pointer is moved closer to the first selection threshold, rendering and progressively enlarging grandchild nodes within the target child node such that the grandchild nodes progressively fill the area of the target child node, the grandchild nodes representing children of the target child node associated with a third level of the tree structure, and concurrently progressively enlarging the area of the target child node around the central node relative to the other child nodes such that, once the pointer has crossed the first selection threshold and a threshold point is created at the point of crossing the first selection threshold, the grandchild nodes have completely filled the area of the target child node, the central node being substantially surrounded by the grandchild nodes so as to represent the target child node, the central node at the time of crossing becoming associated with a second anchor point defined by the threshold point and which is substantially bound by a second selection threshold for further continuous navigation of the tree structure through movement of the pointer towards the second selection threshold.

In some embodiments, once the central node of the node set represents the target child node, the node set may further include an exit node representing an option to navigate back to a state wherein the central node represents the parent, the exit node arranged together with the grandchild nodes substantially around the central node.

In embodiments where the node set is provided with an exit node, the method may include the step of:

during a continuous motion of the pointer which commences in the central node and is directed substantially towards the exit node, as the pointer is moved closer to the second selection threshold, rendering and progressively enlarging child nodes within the exit node such that the child nodes progressively fill the area of the exit node, and concurrently progressively enlarging the area of the exit node around the central node relative to the grandchild nodes such that, once the pointer has crossed the second selection threshold at a threshold point, the child nodes have completely filled the area of the exit node, the central node being substantially surrounded by the child nodes so as to represent the parent, the central node at the time of crossing becoming associated with a third anchor point defined by the threshold point and which is substantially bound by a third selection threshold for further continuous navigation of the tree structure.

Further features provide for progressively enlarging the area of the target child node around the central node and relative to the other child nodes to include one or more of: enlarging the area of the target child node as a function of the movement of the pointer towards the first selection threshold; proportionally enlarging areas of the grandchild nodes being rendered within the target child node; and enlarging the area of the target child node relative to the area of the central node.

Yet further features provide for the user interface to provide a node set repositioning mode associated with a second mode of movement of the pointer. The method may include the step of: responsive to detecting movement of the pointer in the second mode, repositioning the entire node set as a function of the pointer movement in the second mode. A further feature provides for the node set repositioning mode to be entered responsive to a second pointer being detected. Movement of the second pointer together with the pointer may cause repositioning of the node set.

In some embodiments, the central node may be substantially circular, and the nodes arranged around the central node may be displayed as ring segments such that they form a ring around the central node. In some embodiments, as the pointer moves closer to the selection threshold, progressive filling of the area of the target child node may include radial growth of the grandchild nodes within the target child node and/or progressive enlarging of the area of the target child node relative to the other child nodes may include transversal growth of the target child node around the central node and relative to the other child nodes.

The grandchild nodes within the target child node may transversally grow proportionally with the target child node. Enlarging the area of the target child node relative to the other child nodes may result in the grandchild nodes surrounding the central node to an increasing extent. In some embodiments, the grandchild nodes may spawn from an outer perimeter of the ring segment and progressively fill the ring segment in the direction of the central node, such that, once the pointer has crossed the selection threshold, the grandchild nodes have completely filled the ring segment.

Still further features provide for the pointer to remain at a centre point of the central node; for the node set to move along with the pointer as the pointer is moved; and for the anchor point and the selection threshold to remain stationary as the pointer is moved within the bounds of the selection threshold and update once the selection threshold is crossed.

In accordance with a second aspect of the invention, there is provided a user interface for an electronic device, the user interface comprising:
- a display component for displaying a node set, the node set including a central node and a plurality of child nodes arranged substantially around the central node, the central node representing a parent associated with a first level of the tree structure and the child nodes representing children of the parent associated with a second level of the tree structure, wherein the central node is associated with a first anchor point which is substantially bound by a first selection threshold;
- an input receiving component for receiving user input;
- a tracking component for tracking the movement and/or position of a pointer in relation to the anchor point; and
- a rendering and adapting component for, during a continuous motion of the pointer which commences in the central node and is directed substantially towards a target child node, as the pointer is moved closer to the first selection threshold, rendering and progressively enlarging grandchild nodes within the target child node such that the grandchild nodes progressively fill the area of the target child node, the grandchild nodes representing children of the target child node associated with a third level of the tree structure, and concurrently progressively enlarging the area of the target child node around the central node relative to the other child nodes such that, once the pointer has crossed the first selection threshold and a threshold point is created at the point of crossing the first selection threshold, the grandchild nodes have completely filled the area of the target child node, the central node being substantially surrounded by the grandchild nodes so as to represent the target child node, the central node at the time of crossing becoming associated with a second anchor point defined by the threshold point and which is substantially bound by a second selection threshold for further continuous navigation of the tree structure through movement of the pointer towards the second selection threshold.

A further feature provides for the user interface to include an exit node component for rendering an exit node in the node set. In some embodiments, the method may include the step of, once the target child node is represented by the central node of the node set, rendering an exit node in the node set representing an option to navigate back to the parent, the exit node arranged together with the grandchild nodes substantially around the central node.

A further feature provides for the rendering and adapting component to be further configured for, during a continuous motion of the pointer which commences in the central node and is directed substantially towards the exit node, as the pointer is moved closer to the second selection threshold, rendering and progressively enlarging child nodes within the exit node such that the child nodes progressively fill the area of the exit node, and concurrently progressively enlarging the area of the exit node around the central node relative to the grandchild nodes such that, once the pointer has crossed the second selection threshold at a threshold point, the child nodes have completely filled the area of the exit node, the central node being substantially surrounded by the child nodes so as to represent the parent, the central node at the time of crossing becoming associated with a third anchor point defined by the threshold point and which is substantially bound by a third selection threshold for further continuous navigation of the tree structure.

Further features provide for the user interface to include a repositioning component for providing a node set repositioning mode associated with a second mode of movement of the pointer; for the repositioning component to be configured to, responsive to detecting movement of the pointer in the second mode, reposition the entire node set as a function of the pointer movement in the second mode.

Further continuous navigation may be considered to be recursive in that the same method of navigating a tree structure occurs continuously, whilst only the specific node set is updated.

BRIEF DESCRIPTION OF THE DRAWINGS

The invention will now be described, by way of example only, with reference to the accompanying representations in which.

DETAILED DESCRIPTION WITH REFERENCE TO THE DRAWINGS

Embodiments of a user interface and related methods for displaying a plurality of nodes and permitting continuous recursive navigation and selection of a node therefrom are described herein. More particularly, embodiments of a user interface and related methods for selecting a node from a plurality of hierarchically arranged nodes are described. The hierarchically arranged nodes may, for example, be arranged in a tree structure.

Figure 1:
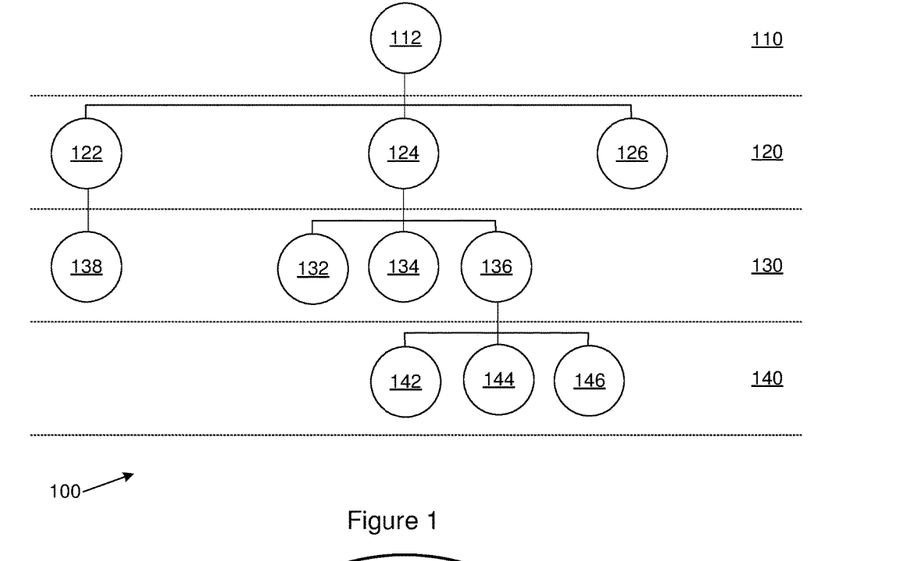
FIG. 1 is a schematic diagram which illustrates an exemplary tree structure.

FIG. 1 is a schematic diagram which illustrates an exemplary tree structure (100). The tree structure (100) includes a plurality of nodes (112, 122, 124, 126, 132, 134, 136, 138, 142, 144, 146) which are hierarchically arranged in levels (110, 120, 130, 140). It should be emphasised at this point that FIG. 1 is exemplary and although only four levels (110, 120, 130, 140) are illustrated, it is anticipated that in some implementations there may be many more. Similarly, there may be any suitable number of nodes (112, 122, etc.) associated with a level.

Respective nodes (112, 122, etc.) in the tree structure (100) are associated with respective levels (110, 120, 130, 140). In the illustrated tree structure (100), a root node (112) is associated with a root level (110). A first set of nodes (122, 124, 126) is associated with a first level (120), a second set of nodes (132, 134, 136, 138) with a second level (130) and a third set of nodes (142, 144, 146) with a third level (140).

Some nodes may be "parent" nodes in that they have one or more "child" nodes of a lower or succeeding level associated therewith, while other nodes by be "grandchildren" as they are associated with a level two levels below a parent node. For example, in the tree structure (100) illustrated in FIG. 1, the root node (112) of the root level (110) has three child nodes (122, 124, 126) of the first level (120) and four grandchild nodes (132, 134, 136, 138) of the second level (130). A second named node (124), which is a child of the root node (112), has its own child nodes (132, 134, 136) and grandchild nodes (142, 144, 146).

And so it may be that any given node referred to herein may have a single parent node of a preceding level associated therewith and may too have a plurality of child nodes and/or grandchild nodes of succeeding levels of the hierarchy, as well as further associated nodes in succeeding levels, depending, of course, on the number of levels below the particular node.

The term "node" should be broadly interpreted. A node may refer to a point within a tree structure to which it is possible or permissible to navigate. Specific implementations of user interfaces and methods described herein may provide nodes which are "interactive items". For example, in a tree structure being a computer file system, nodes may be folders; subfolders; files; icons; image files; music files and the like. Similarly, in the case of a tree structure being a menu of a mobile software application, nodes may be headings, subheadings and end-points such as applications, settings and so on. Other embodiments may provide a tree structure being a contacts list, or a photo or music library, with nodes being albums, photos or songs, as the case may be, and the like. In some cases, the tree structure may be a product catalogue provided by an e-commerce merchant, with nodes representing product categories, product manufacturers, products and the like. It should therefore be appreciated that examples of node sets and applications described herein are non-limiting.

Figure 2:
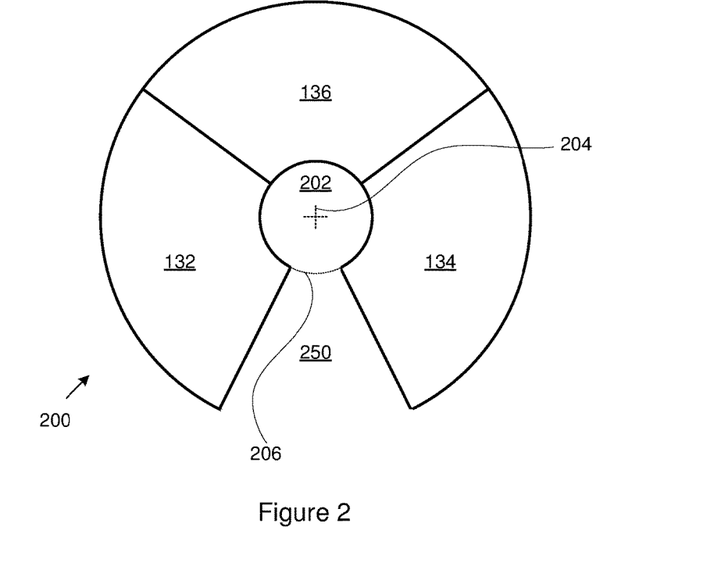
FIG. 2 is a schematic diagram which illustrates an exemplary node set according to some embodiments.

In order to permit a user of an electronic device to recursively navigate a tree structure such as the tree structure (100) of FIG. 1, embodiments of user interfaces described herein are configured to display and continuously adapt a node set. FIG. 2 is a schematic diagram which illustrates an exemplary node set (200) which may be displayed by a user interface according to some embodiments.

The node set (200) includes a central node (202) which represents a parent and a plurality of child nodes (132, 134, 136) arranged around the central node. In the example of FIG. 2, the central node represents a node (124) from the first level (120) of the tree structure (100), and the child nodes represent children of the parent associated with the second level (130) of the tree structure (100). During navigation, the node set (200) may be continuously adapted such that, at a later stage, the central node (202) may for example represent a node (136) of the second level (130), while the child nodes represent its children (142, 144, 146) in the third level (140).

The child nodes (132, 134, 136) are arranged substantially around the central node (202). The example of FIG. 2 also includes an exit node (250) arranged together with the child nodes (132, 134, 136) around the central node (202). The exit node (250) represents an option to navigate back to a higher level, in this case to the root node (112) of the root level (110), the root node (112) being the parent of the node (124) represented by the central node (202). In some cases there may not be an exit node in the node set. For example, if the central node (202) represents the root node (112), which has no parent node, there may typically be no exit node (250), as the central node (202) already represents the highest level in the tree structure (100). An exit node enables a hierarchy structure to be reversibly navigated, as will become clear in what follows.

The central node (202) is associated with a first anchor point (204), which is bound by a first selection threshold (206). In this embodiment, the first anchor point (204) is the centre point of the first selection threshold (206). At the stage shown in FIG. 2, the first selection threshold (206) circumscribes the central node (202). The anchor point and selection threshold are discretely repositioned during navigation, and this repositioning is under user control, as will be described in greater detail below. It should be appreciated that, throughout the specification, anchor points and selection thresholds are shown in dotted lines and are primarily for illustrative purposes. When implemented in a user interface, they may not be visible to a user.

Some embodiments, such as those shown in the drawings, provide for the nodes to be arranged so as to substantially form a ring around the central node. As shown in FIG. 2, the nodes (132, 134, 136, 250) arranged around the central node (202) are displayed as ring segments such that they form a ring around the central node (202).

By providing a node set (200) along with user interface components yet to be described, embodiments of the user interfaces and related methods described herein may provide greater efficiency in human-computer interaction. Conventional repetitions of "point and click" or time-consuming navigation of tree structures (e.g. multiple menus and/or submenus and the like) may be significantly reduced or completely eliminated. Furthermore, the described methods and user interfaces may allow for smoother and more dynamic human-computer interaction. The above may, for example, be achieved by allowing a user to navigate, preview and select a node from a large number of nodes in a continuous pointer motion.

Figure 3:
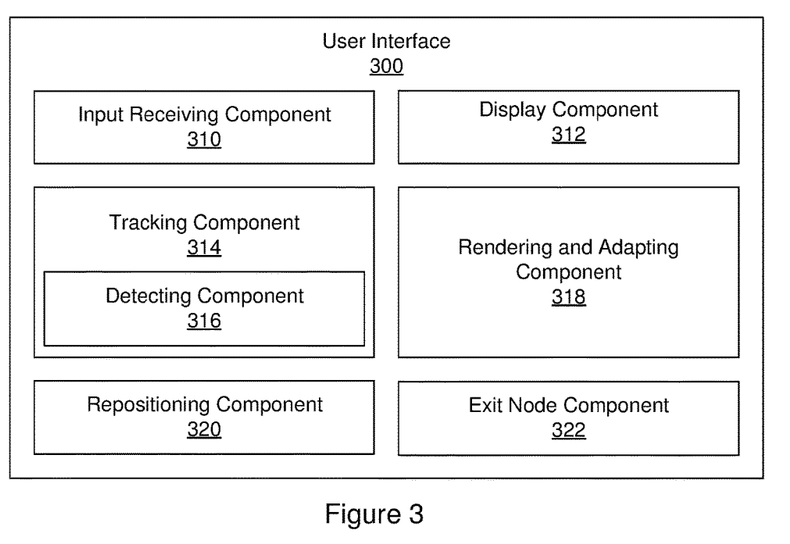
FIG. 3 is a block diagram which illustrates components of an exemplary user interface for navigating a tree structure.

FIG. 3 is a block diagram which illustrates components of an exemplary user interface (300). The user interface (300) may be executing or executable on an electronic device such as a mobile phone, tablet computer, personal computer, gaming console, household appliance or smart household appliance, motor vehicle entertainment system, or the like.

The user interface (300) may include an input receiving component (310) for receiving user input. User input may be received by way of a pointer of a user (e.g. a finger or a stylus) contacting a touch-sensitive control region such as a touch-sensitive display of the electronic device. Alternatively, the user input may be received by way of a pointing device such as a trackpad, mouse, joystick of a gamepad, or the like. Throughout this specification, "movement" of the pointer should be broadly interpreted and may include dragging the pointer along a touch-sensitive region without lifting it therefrom, or sliding the pointer along a touch-sensitive region. The term "continuous movement" may refer to the pointer following a continuous or at least substantially continuous track.

The user interface (300) may further include a display component (312) for displaying a node set. As described above, the node set may include a central node and a plurality of child nodes arranged substantially around the central node, the central node representing a parent associated with a first level of the tree structure and the child nodes representing children of the parent associated with a second level of the tree structure. The central node is associated with an anchor point which is substantially bound by a selection threshold.

The user interface (300) may further include a tracking component (314) for tracking movement and/or position of a pointer in relation to the anchor point. In some embodiments, the tracking component (314) may track a continuous motion of the pointer. The tracking component (314) may also include a detecting component (316) which may detect certain characteristics in the movement of the pointer. The detecting component (316) may detect a second mode of movement, selection actions, termination actions, and the like.

The user interface (300) may further include a rendering and adapting component (318). During a continuous motion of the pointer which commences in the central node and is directed substantially towards a target child node, as the pointer is moved closer to the first selection threshold, the rendering and adapting component (318) may render and progressively enlarge grandchild nodes within the target child node such that the grandchild nodes progressively fill the area of the target child node. The grandchild nodes represent children of the target child node associated with a third level of the tree structure.

Substantially concurrently, the rendering and adapting component (318) may progressively enlarge the area of the target child node around the central node relative to the other child nodes. Adapting is performed continuously, and not in discrete "jumps", such that, once the pointer has crossed the first selection threshold, the point where that occurs defining a threshold point, the grandchild nodes have completely filled the area of the target child node. At this stage, the central node is substantially surrounded by the grandchild nodes so as to represent the target child node and no longer the parent, the central node at the time of crossing becomes associated with a second anchor point defined by the threshold point, and the second anchor point is substantially bound by a second selection threshold for further continuous, unbroken navigation of the tree structure through movement of the pointer towards the second selection threshold. These aspects will be discussed in greater detail with reference to FIGS. 4 and 5.

In some embodiments, the rendering and adapting component (318) may be configured to, in progressively enlarging the area of the target child node around the central node and relative to the other child nodes, carry out one or more of the following: enlarging the area of the target child node as a function of the movement of the pointer towards the first selection threshold, proportionally enlarging areas of the grandchild nodes being rendered within the target child node, and enlarging the area of the target child node relative to the area of the central node.

The user interface may include a repositioning component (320) for providing a node set repositioning mode associated with a second mode of movement of the pointer. The repositioning component may be configured to, responsive to detecting movement of the pointer in the second mode using the detecting component (316), reposition the entire node set and the anchor point with its associated threshold as a function of the pointer movement in the second mode.

The user interface (300) may further include an exit node component (322) for rendering an exit node in the node set. In some embodiments, once the target child node is represented by the central node of the node set, the exit node component (322) renders an exit node in the node set representing an option to navigate back to the parent, the exit node arranged together with the grandchild nodes substantially around the central node, as shown in FIG. 2.

A user may wish to navigate back to a preceding level. In other words, the user may wish to return to a state where the central node no longer represents the target child node, but rather represents the parent node once more. In order to effect such reversible navigation, the rendering and adapting component (320) and/or the exit node component (322) may be further configured for, during a continuous motion of the pointer which commences in the central node and is directed substantially towards the exit node, as the pointer is moved closer to the second selection threshold, rendering and progressively enlarging child nodes within the exit node such that the child nodes progressively fill the area of the exit node, and concurrently progressively enlarging the area of the exit node around the central node relative to the grandchild nodes.

Such adapting is continuously performed such that, once the pointer has crossed the second selection threshold at a threshold point, the child nodes have completely filled the area of the exit node, the central node being substantially surrounded by the child nodes so as to represent the parent, the central node at the time of crossing becoming associated with a third anchor point defined by the threshold point and which is substantially bound by a third selection threshold for further continuous, unbroken navigation of the tree structure. In other words, in some embodiments, the anchor point and selection threshold may remain stationary until the threshold is crossed. Upon crossing, the anchor point may become positioned at the threshold point and a new selection threshold may be defined around it.

Visual adjustments associated with crossing of selection thresholds may be substantially seamless. In other words, coordination between control and display may be implemented to enable gradual change, such that the parent node has already become represented by the central node exactly at the moment when the particular threshold is reached, without requiring a visible "jump" between two distinct states.

In some embodiments the pointer may have a second mode associated therewith. The second mode may be entered responsive to a second pointer on the user interface being detected, the second pointer moving with the pointer. The second pointer may, for example, be an additional finger of a user engaging the touch-sensitive control region of the electronic device. In other embodiments, the second mode may be entered by a user holding down a particular button on a mouse, for example. The repositioning component (320) may, responsive to the detecting component (316) detecting movement of the pointer in the second mode, reposition the node set as a function of the pointer movement. Movement of the second pointer together with the pointer may thus cause repositioning of the node set, including the current anchor point and its associated threshold.

The second mode may provide a repositioning capability, allowing the entire node set to be moved relative to an electronic device display, for example by dragging it to a different position on a display of an electronic device. The entire node set will move, along with the anchor point and selection threshold, typically while the pointer remains in the central node. In such a case, although there is movement from the central node towards a child node, the child node simultaneously moves along with the central node and the other nodes in the node set. In this way, relative positions of the nodes in the node set remain unchanged. Such repositioning may be necessary for further navigation, as the node set may typically move around in a display of an electronic device due to the movement of the anchor points and thresholds (these essentially "jump" at each threshold crossing event), as will be described with reference to FIGS. 4 and 5.

The repositioning component (320) may also, responsive to the detecting component (316) detecting that a second pointer in the second mode is being moved on an approximately circular arc, rotate the entire node set (200) so as to enable a user to view nodes which may have been occluded by a user's hand. The repositioning component (320) may still further, responsive to the detecting component (316) detecting that a second pointer in the second mode is being moved towards or away from the pointer, increase or decrease the size of the entire node set (200).

A user interface such as the user interface (300) described above with reference to FIG. 3 may be used to perform a method for recursively and reversibly navigating a tree structure in a continuous motion. The flow diagram of FIG. 4 sets out steps which may be performed in an exemplary method (400) for navigating a tree structure, while FIGS. 5A to 5E are schematic diagrams which illustrate an electronic device executing a user interface performing the method (400) at various selected stages.

Figure 4:
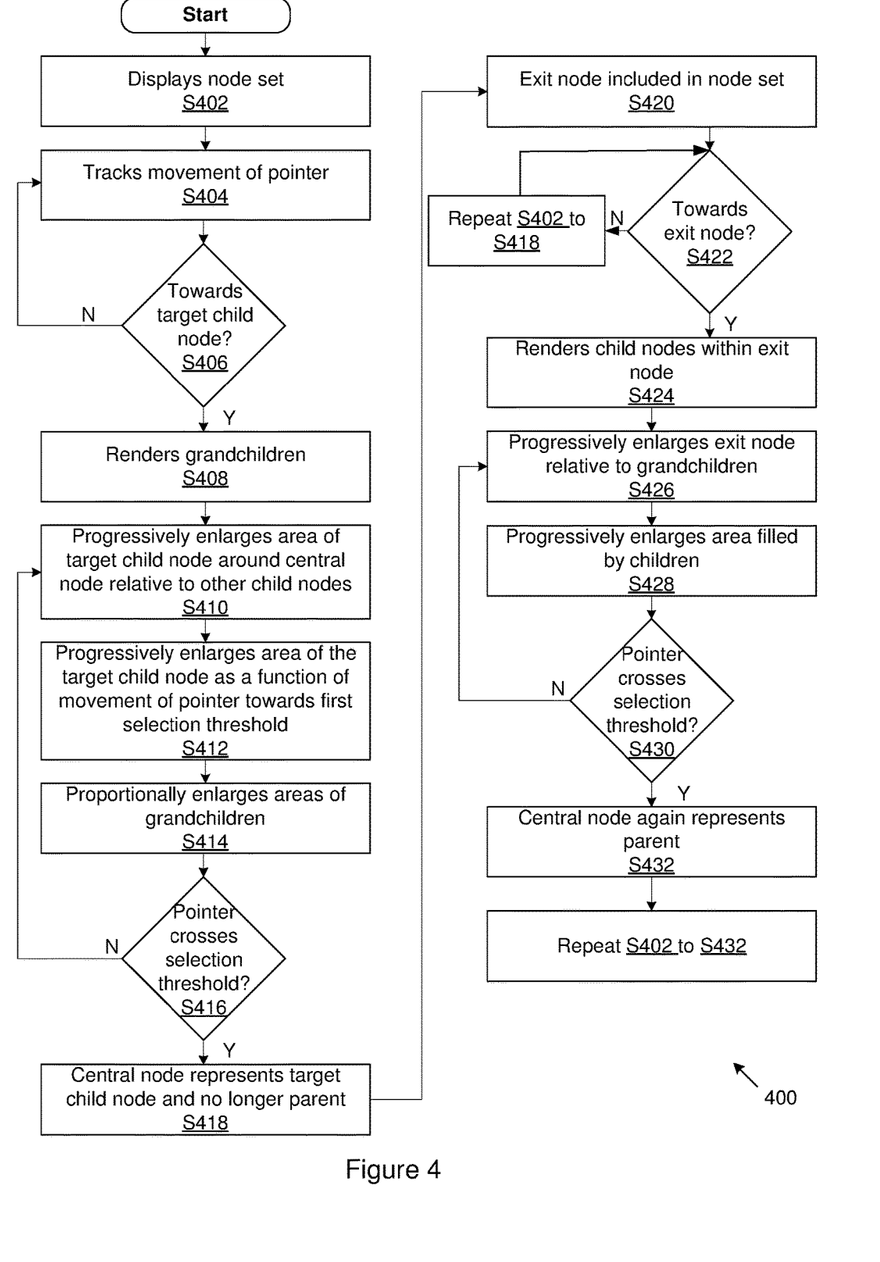
FIG. 4 is a flow diagram which illustrates an exemplary method for navigating a tree structure; and, FIGS. 5A to 5E are schematic diagrams which illustrate an electronic device executing an exemplary user interface performing the method of FIG. 4 at various selected stages.

It should be understood that, while the steps in the flow diagram (400) of FIG. 4 are shown and described sequentially, some of the steps may be carried out concurrently or simultaneously in order to provide a continuous and progressive change in the node set. The node set (500) shown in FIGS. 5A to 5E is similar to the node set (200) of FIG. 2, and like reference numerals refer to like components and nodes.

In the example provided, grandchild nodes are visually spawned as arcs covering the outer boundary of a growing child segment, the central node being associated with the parent. These arcs then become ring segments as they expand inwards in the radial direction to fill the child segment, while they also adapt their angular extent to keep the child covered from side to side. These changes in child and grandchild nodes may be coordinated in such a way that the child node completes its transformation to its maximum size at the same instant as the grandchild nodes collectively cover it completely. This leads to a configuration similar to the initial one shown in FIG. 2, but it shows the next level wherein the central node represents the selected child node and not the parent of the child node. Such navigation may be iterated without interruption of the control movement, allowing a smooth recursive traversal of the hierarchy. "Backing out" is enabled by creating an exit node, which is typically included at every level except the first level.

At a beginning of the method shown in the diagram (400) of FIG. 4, a node set (500) may be displayed (S402). Then, the position and/or movement of a pointer (502) may be tracked (S404) in relation to the anchor point. During the tracking of a continuous motion of the pointer (502) having commenced in the central node and in the relation to the anchor point, movement of the pointer towards a target child node may be detected (S406). It should be noted that the pointer (502) may not be visible in some implementations, for example, where a touch-sensitive display is employed. The pointer (502) is primarily shown for illustrative purposes.

In some embodiments, and as shown in FIGS. 5A to 5E, the pointer (502), while moving along a display of an electronic device, remains at the centre of the central node (202). The association between the central node and the anchor point of a particular level is that, when navigation of that level commences, the anchor point is at the centre point of the central node and the selection threshold circumscribes the central node. When the pointer (502) moves, the node set (500) itself moves with the pointer while the anchor point and selection threshold remains stationary. Only once the pointer moves through the selection threshold will the anchor point and selection threshold be updated, as will be set out below.

It should be appreciated that movement of the pointer "substantially towards a target child node" may, in some embodiments, refer to movement towards a section or segment of the current selection threshold which represents the target child node. In some embodiments and as described above, the nodes will move as the pointer is moved, while the anchor point and selection threshold remains stationary. Different sections of the selection threshold, which remain stationary, may then represent the different child nodes, and crossing of a particular section of the threshold is associated with selection of the represented child node. Movement "towards a target child node" should thus be interpreted to include moving towards the visible node itself or movement towards a fixed segment of a threshold associated with that target child node.

It is further envisaged that movement aimed substantially at a boundary separating two neighbouring child nodes, or at a boundary between two sections of the selection threshold representing the neighbouring child nodes, may cause the grandchildren of both child nodes to be rendered.

As the pointer (502) moves towards a target child node (e.g. 136), child nodes move in the same direction while the first anchor point (204) and the first selection threshold (206) remain stationary (as long as the pointer (502) remains within the bounds of the first selection threshold (206)). Grandchildren (142, 144, 146), which are children of the target child node (136), may then be rendered (S408) within the target child node (136). The children of the target child node (142, 144, 146) are associated with a third level of the tree structure, as explained above. The directional arrow in FIGS. 5A to 5E indicate the direction in which the pointer (502) is moved.

In some embodiments, and as shown in the drawings, the grandchildren may be rendered from an outer perimeter of the ring segments and grow inwards, as if they appear "over the horizon" of the node set. In some embodiments, the children appear on the "horizon" of the ring similar to previously invisible features in a landscape that would become visible on approach.

As the pointer (502) moves closer to the first selection threshold (206), which remains stationary, the area of the target child node (136) may be enlarged relative to the other nodes (132, 134, 250) and as a function of the movement of the pointer (502) towards the first selection threshold.

Also, the user interface proportionally enlarges areas of the grandchild nodes (142, 144, 146) being rendered within the target child node (136), and enlarges the area of the target child node (136) relative to the area of the central node (202), which at this stage still represents the parent (124) of the target child node (136).

As the pointer (502) moves closer to the target child node (136), the grandchild nodes (142, 144, 146) are continuously enlarged relative to the parent so as to eventually cover the parent completely. In this way, the target child node grows to cover the central node while the grandchild nodes concurrently grow within the target child node so as to eventually completely fill the target child node and surround the central node (202).

While grandchildren of the target child node are rendered (S408) within the target child node, an area of the target child node may be progressively enlarged (S410) relative to the other child nodes. Additionally, the area of the target child node around the central node may be enlarged (S412) as a function of the movement of the pointer towards the target child node. Furthermore, the stage of continuously enlarging (S410) an area of the target child node relative to remaining child nodes may include a stage of proportionally enlarging (S414) areas of the children of the target child node being rendered within the target child node.

The grandchild nodes may typically fill the target child node to an equal degree and may not be relatively adapted according to the pointer direction or movement, whereas the size and angular extent of the other child nodes may be adapted relative to the target child node according to pointer direction and movement. In such a case, it can be said that the grandchild nodes may be displayed primarily for preview purposes and do not essentially "compete" for position around the central node as the child nodes do.

In some embodiments, therefore, as the pointer moves closer to the selection threshold, progressive filling of the area of the target child node may include radial growth of the grandchild nodes within the target child node and progressive enlarging of the area of the target child node relative to the other child nodes may include transversal growth of the target child node around the central node and relative to the other child nodes.

The grandchild nodes within the target child node may transversally grow proportionally with the target child node. Enlarging the area of the target child node relative to the other child nodes may result in the grandchild nodes surrounding the central node to an increasing extent.

As mentioned above, the grandchild nodes may spawn from an outer perimeter of the ring segment and progressively fill the ring segment in the direction of the central node, such that, once the pointer has crossed the selection threshold, the grandchild nodes have completely filled the ring segment.

The above-described visual adjustment occurs continuously such that, once the pointer (502) has crossed (S416) the first selection threshold (206) at a threshold point (504), the grandchild nodes (142, 144, 146) have completely filled the area of the target child node. At this stage, the central node (202) is surrounded by the grandchild nodes, as well as the exit node (250) which remains in the node set (500). In this way, the central node (202) no longer represents the parent associated with the first level (120), but has switched (S418) to now represent the target child node (136). This indicates that the next level in the hierarchy has been reached. Of course, in implementations of the invention, this may be clear from node illustrations and/or descriptions.

Figure 5A:
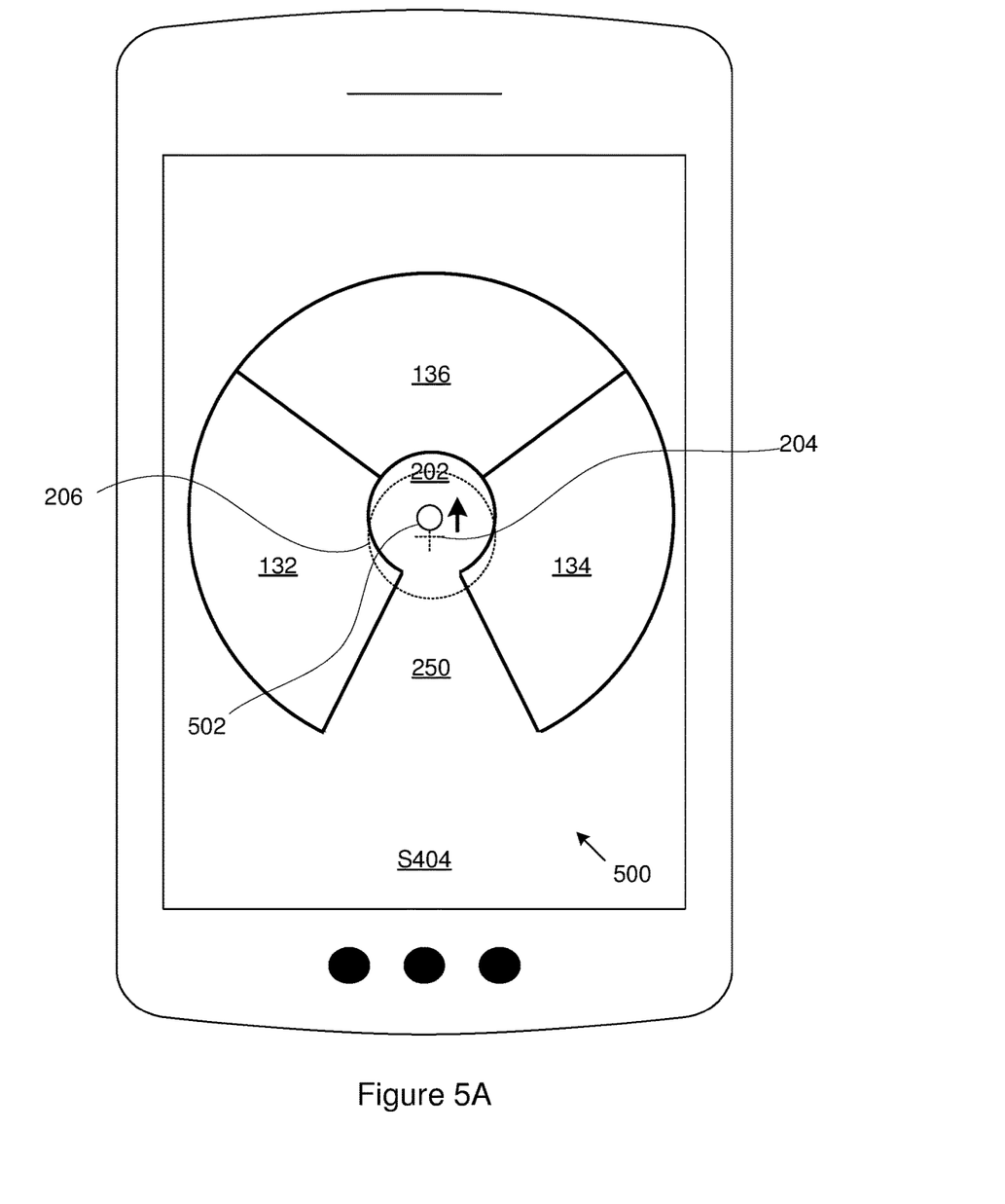
Figure 5B:
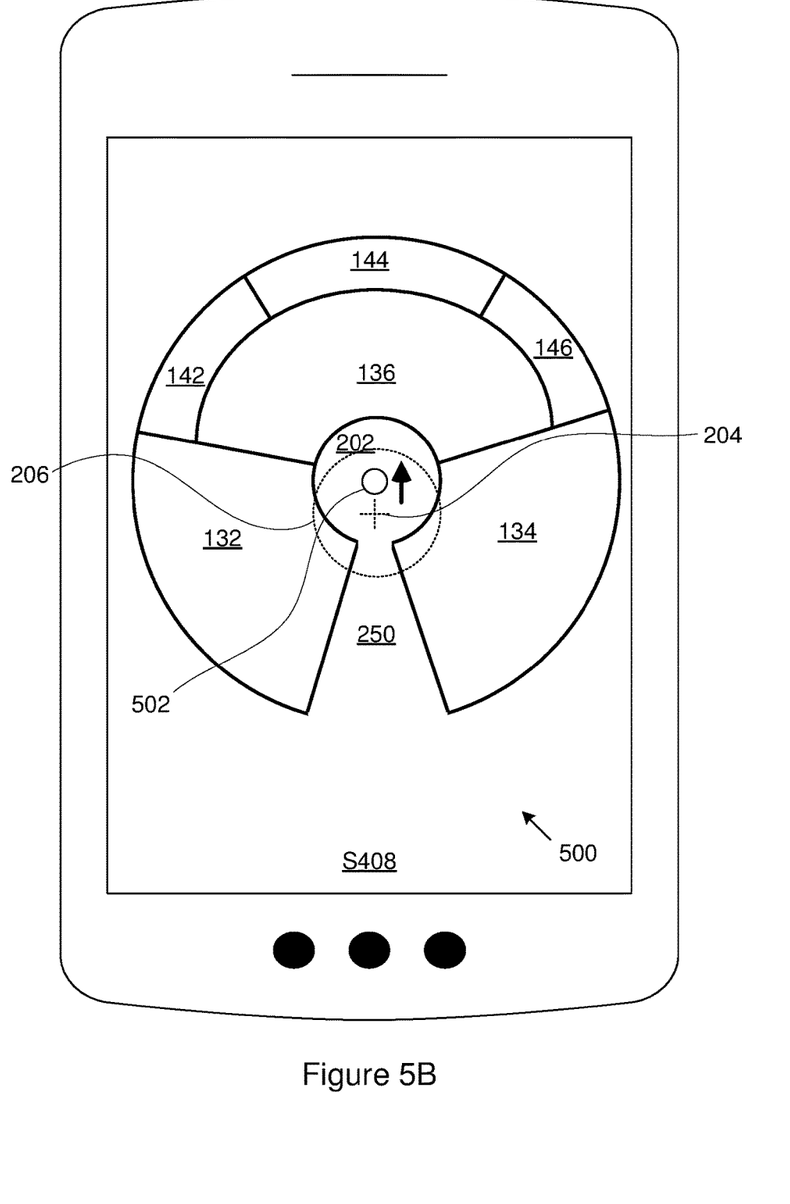
Figure 5C:
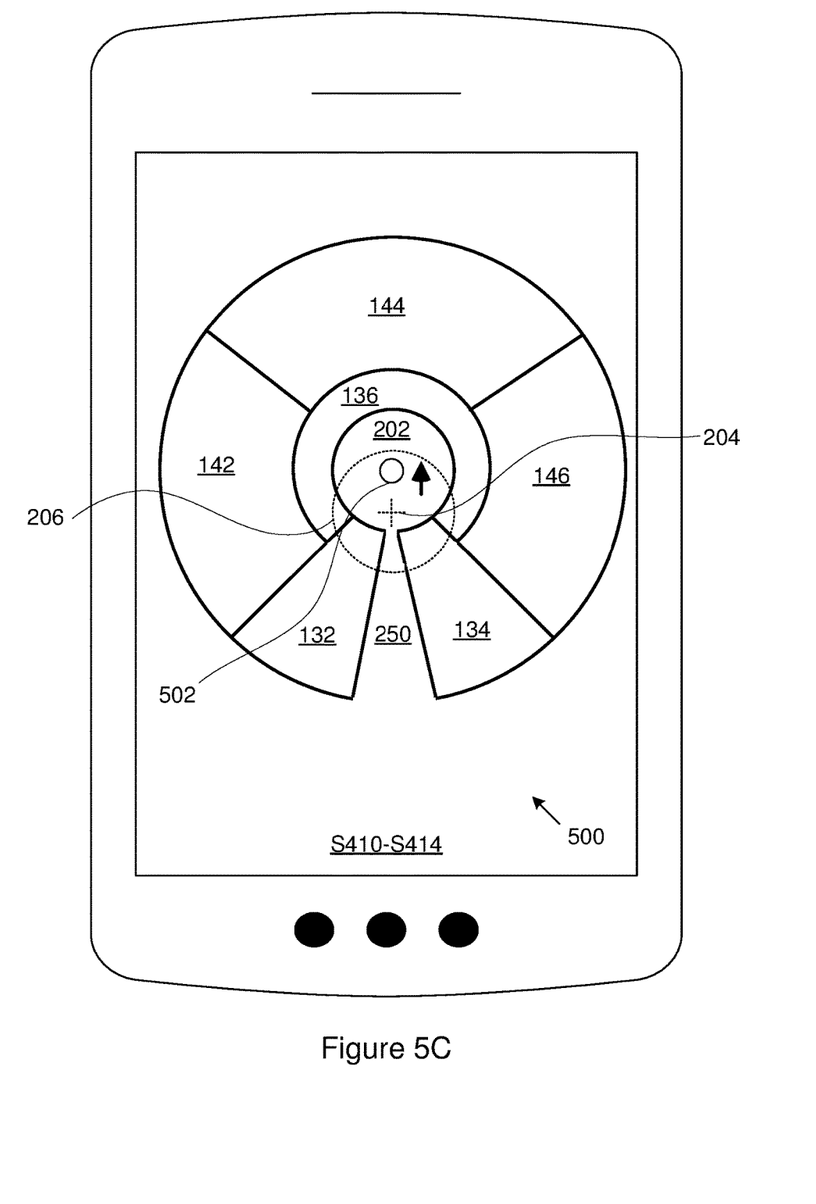
Figure 5D:
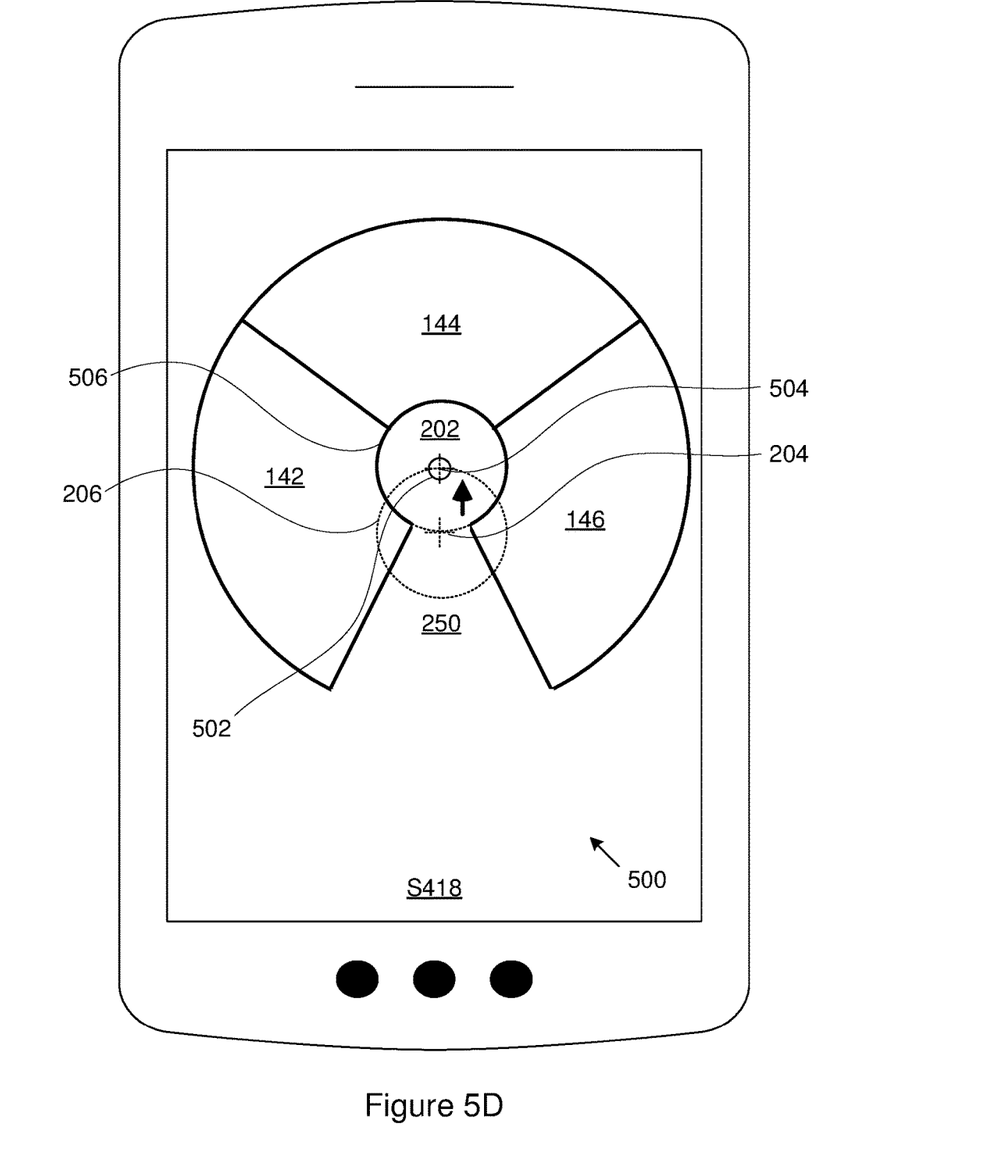
Figure 5E:
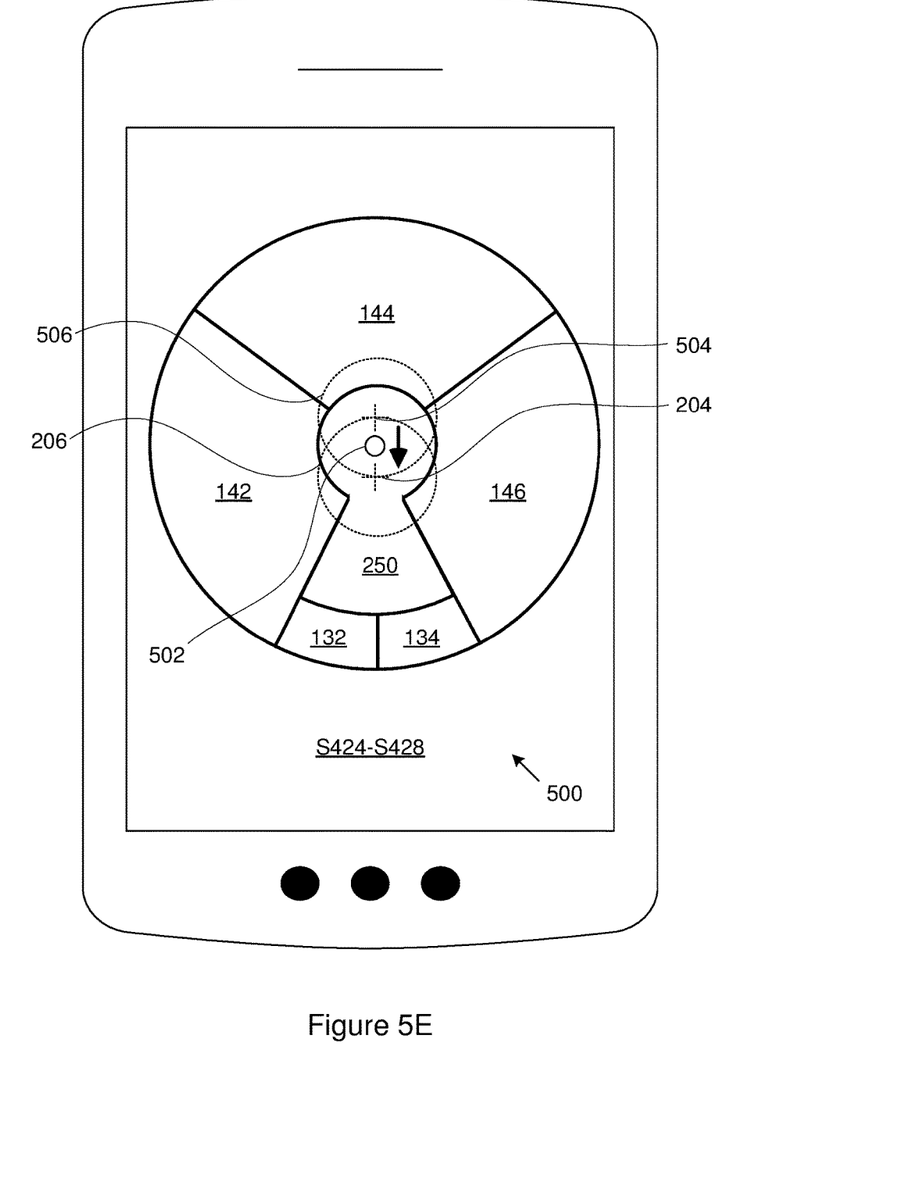

At this stage, a second anchor point becomes defined by the threshold point (504) while a second selection threshold (506) becomes positioned relative to the second anchor point, such that the central node (202) is associated with the second anchor point which is bound by a new selection threshold for further continuous navigation of the tree structure through movement of the pointer towards the second selection threshold (506). These features are best illustrated in FIG. 5D.

It should be emphasised that there may be no visual jump or discrete change indicating that the second selection threshold (506) is in place. The thresholds (206, 506) and anchor points (204, 504) may not even be visible to the user. However, sound, haptic feedback or animation, such as an audible click, may be incorporated into the user interface to inform a user that a next level has been reached or that the first selection threshold (206) has been crossed. Once the second selection threshold (506) is in place, the first selection threshold (206) and first anchor point (204) may no longer be used. They are thus mainly shown in the drawings for illustrative purposes.

Once the first selection threshold (206) has been crossed, the pointer (502) may be moved from the second anchor point in the direction of any of the grandchild nodes (142, 144, 146) to navigate even "deeper" into the hierarchy. Alternatively, the pointer (502) may be moved towards the exit node (250) to navigate up to higher levels of the hierarchy. As described above, the exit node (250) represents an option to navigate back to a state wherein the central node (202) represents the parent once more. The exit node may be displayed as the parent node through illustration or description.

If an exit node was not included in the node set (500) when the central node (202) represented the parent, the exit node (250) is rendered upon crossing of the first selection threshold (206) at a next stage and included (S420) in the node set. The user interface may detect (S422) movement of the pointer towards the exit node at a following stage. If movement is not towards an exit node, the previous steps (S402 to S418) are repeated as movement of the pointer is continuously tracked. If movement is towards an exit node (S422), the child nodes (132, 134), may then be rendered (S424) within the exit node (250), which may be shown as the parent node, as the pointer (502) moves closer to the second selection threshold (506) in the direction of the exit node (250), at a following stage. The other child node (136) is already represented by the grandchild nodes (142, 144, 146) shown.

The stage of rendering (S424) the child nodes may include stages of progressively enlarging (S426), as a function of the movement of the pointer towards the exit node (250), the exit node relative to the grandchild nodes (142, 144, 146), and proportionally enlarging (S428) the child nodes being (132, 134) rendered within the exit node (250), while the grandchild nodes (142, 144, 146) gradually recede back into the other child node (136). This allows a user to preview the child nodes that will be available for selection if the user decides to navigate back to the parent node.

As the pointer (502) moves towards the second selection threshold (506), the child nodes progressively fill the area of the exit node, and concurrently, the area of the exit node around the central node relative to the grandchild nodes is enlarged. Such adapting is continuously performed such that, once the pointer (504) has crossed (S430) the second selection threshold (506) at a threshold point, the child nodes have completely filled the area of the exit node at a next stage.

At a next stage then, the central node (202) is substantially surrounded by the child nodes (132, 134, 136) so as to represent (S432) the parent (124) once more, and may be associated with a third anchor point defined by the threshold point where the second selection threshold (506) was crossed, the third anchor point being bound by a third selection threshold. In this way, the node set (500) may be recursively and reversibly navigated by moving the pointer (502) either towards a target child node (downwards in the hierarchy) or towards an exit node so as to move back to a parent node (upwards in the hierarchy). The method recursively repeats itself thereafter (S402 to S432).

As already mentioned above, some embodiments provide for the pointer to have a second mode associated therewith, and for the method (400) to include a stage of, responsive to detecting movement of the pointer in the second mode, repositioning the node set as a function of the pointer movement. The second mode may be entered responsive to a second pointer on the user interface being detected and where the second pointer moves with the pointer. In some embodiments, responsive to detecting that a second pointer is being moved on an approximately circular arc, the entire node set is rotated so as to enable a user to view nodes which may have been occluded by a user's hand. Further, responsible to detecting that a second pointer is being moved towards or away from the pointer, the entire node set is resized.

It should be understood that, while the descriptions herein primarily deal with "downward" navigation of a hierarchy, in other words, with movement of the pointer from the anchor point towards some point on the threshold, a user may at any time "back out" by navigating back towards the anchor point instead. In such cases, the stages described with reference to FIG. 4 may essentially be carried out in reverse, undoing the changes to the node set, and effectively allowing the user to preview child and grandchild nodes without having to select them.

User interfaces and methods described herein may facilitate navigation of tree structures. In use, a user may use a user interface to navigate a tree structure being, for example, a product catalogue of an online store or e-commerce merchant. In one exemplary in-use scenario, a user may for example wish to purchase an e-book from an online store. The user may begin at a first level of the tree structure and, using the user interface and displayed node set, navigate to a second level of the tree structure being, for example, fiction. The node set may be adapted with fiction being the central node and a plurality of genres being the child nodes surrounding the central node. The user may then preview authors, being child nodes of the genres, by moving the pointer towards a genre of interest. The user interface may render authors of a particular genre towards which the user moves the pointer. In this manner, a user can easily preview authors within certain genres without actually selecting a genre. Once the user has identified a genre of interest, the user can move the pointer past the threshold, causing the node set to adapt, with the selected genre becoming the central node and the authors within that genre becoming child nodes surrounding the central node. The user may continue navigating the tree structure in this fashion until the user identifies an e-book of interest. The user may, if desired, navigate back to higher levels of the hierarchy by moving the pointer towards an exit node which is displayed together with child nodes of a parent which is represented by the central node.

In some embodiments, actions on a file or interactive item may be added as another hierarchical level. For example, lifting the finger at the level of the file itself may trigger a default action, such as playing the file. Movement and deletion may appear as children of the file, and may be selected by navigation to that level and selecting a desired action. In some embodiments, a final terminal node in the tree structure may be the selection target, and a selection action is performed by simply reaching that terminal node.

In some embodiments, an intermediary node with children nodes may be an actual target. In embodiments where the pointer is a finger of a user, lifting of the finger off the touch-sensitive display may indicate a selection action performed on the node below the pointer at the moment the pointer is lifted from the screen. In embodiments where the pointer is a mouse, a click of the mouse while the pointer is on a node may indicate a selection action performed on the node.

Discrete recursion or jumping from level to level is routinely used to traverse data sets in a number of known user interfaces, for example in graphical user interface (GUI) navigation of nested directories and files in a file hierarchy. The technology described enables continuous recursive navigation of a graphical representation of a discrete hierarchy, and enables the method to be successfully carried out in a finite display window by way of repositioning characteristics whereby a user can, for example, drag the node set around in the display of the electronic device.

Embodiments may enable unlimited, continuous recursion and reversible recursive navigation of a tree having levels with nodes. It may be possible to continuously and recursively traverse the hierarchy to any desired depth. This process may be repeated as long as the screen allows, and a recentralizing or repositioning option is provided to deal with cases where the screen prevents further navigation. Reverse navigation is enabled by the creation of an exit node at every level. The user can thus smoothly "glide" from one level to another, instead of jumping between levels, as may be the case in known user interfaces.

The above description is by way of example only and it should be appreciated that numerous changes and modifications may be made to the embodiments described without departing from the scope of the invention.

For example, in some embodiments, a pointer region may be provided which, when displayed on a display screen of an electronic device executing the user interface, may be spaced apart from the node set. This is known as control indirection. For example, the pointer region may be provided towards a bottom corner of a touch-sensitive display of the electronic device while the node set may be displayed more centrally. Such an implementation may map movement of the pointer (being movement of a user's finger in this case) in the pointer region to movement of a "ghost pointer" proximate the central node. This may avoid scenarios where user's finger occludes portions of the node set making navigation to certain child nodes problematic.

It should be noted that methods described herein involve continuous control and display, and not simply animation which is triggered by a distinct action from the user. Embodiments of the invention may incorporate animation into the user interface to, for example, provide for smoother transitions when nodes are selected.

It should be noted that, in order to facilitate understanding of the invention, the parent node is typically referred to as being associated with the first level or a root level of a hierarchy, while the children and grandchildren are associated with the levels immediately below the parent. It should be understood that these nodes may be associated with any succeeding set of levels, and the same method may be carried out to navigate through a large number of levels.

The foregoing description has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The software components or functions described in this application may be implemented as software code to be executed by one or more processors using any suitable computer language such as, for example, Java, C++, or Perl using, for example, conventional or object-oriented techniques. The software code may be stored as a series of instructions, or commands on a non-transitory computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

Any of the steps, operations, or processes described herein may be performed or implemented with one or more hardware or software modules, alone or in combination with other devices. In one embodiment, a software module is implemented with a computer program product comprising a non-transient computer-readable medium containing computer program code, which can be executed by a computer or electronic device processor for performing any or all of the steps, operations, or processes described.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A method of navigating a tree structure in a continuous motion, the method conducted in a user interface and comprising:
    displaying a node set, the node set including a central node and a plurality of child nodes arranged around the central node, the central node representing a parent associated with a first level of the tree structure and the child nodes representing children of the parent associated with a second level of the tree structure, wherein the central node is associated with a first anchor point which is bound by a first selection threshold;
    tracking a movement or a position of a pointer in relation to the anchor point; and
    during a continuous motion of the pointer which commences in the central node and is directed towards a target child node, as the pointer is moved closer to the first selection threshold, rendering and progressively enlarging grandchild nodes within the target child node such that the grandchild nodes progressively fill an area of the target child node, the grandchild nodes representing children of the target child node associated with a third level of the tree structure, and concurrently progressively enlarging the area of the target child node around the central node relative to other child nodes such that, once the pointer has crossed the first selection threshold and a threshold point is created at the point of crossing the first selection threshold, the grandchild nodes have completely filled the area of the target child node, the central node being surrounded by the grandchild nodes so as to represent the target child node, the central node at the time of crossing becoming associated with a second anchor point defined by the threshold point and which is bound by a second selection threshold for further continuous navigation of the tree structure through movement of the pointer towards the second selection threshold.

2. The method as claimed in claim 1 wherein, once the central node of the node set represents the target child node, the node set further includes an exit node representing an option to navigate back to a state wherein the central node represents the parent, the exit node arranged together with the grandchild nodes around the central node.

3. The method as claimed in claim 2 which includes the step of:
    during a continuous motion of the pointer which commences in the central node and is directed towards the exit node, as the pointer is moved closer to the second selection threshold, rendering and progressively enlarging child nodes within the exit node such that the child nodes progressively fill the area of the exit node, and concurrently progressively enlarging the area of the exit node around the central node relative to the grandchild nodes such that, once the pointer has crossed the second selection threshold at a threshold point, the child nodes have completely filled the area of the exit node, the central node being surrounded by the child nodes so as to represent the parent, the central node at the time of crossing becoming associated with a third anchor point defined by the threshold point and which is bound by a third selection threshold for further continuous navigation of the tree structure.

4. The method as claimed in claim 1 wherein the step of progressively enlarging the area of the target child node around the central node and relative to the other child nodes includes one or more of: enlarging the area of the target child node as a function of the movement of the pointer towards the first selection threshold; proportionally enlarging areas of the grandchild nodes being rendered within the target child node; and enlarging the area of the target child node relative to the area of the central node.

5. The method as claimed in claim 1 wherein the user interface provides a repositioning mode associated with a second mode of movement of the pointer, the repositioning mode including the step of:
responsive to detecting movement of the pointer in the second mode, repositioning the entire node set as a function of the pointer movement in the second mode.

6. The method as claimed in claim 5 wherein the repositioning mode is entered responsive to a second pointer being detected, and movement of the second pointer together with the pointer causes repositioning of the node set.

7. The method as claimed in claim 1 wherein the central node is circular, and the nodes arranged around the central node are displayed as ring segments forming a ring around the central node.

8. The method as claimed in claim 7 wherein, as the pointer moves closer to the selection threshold, progressive filling of the area of the target child node includes radial growth of the grandchild nodes within the target child node and progressive enlarging of the area of the target child node relative to the other child nodes includes transversal growth of the target child node around the central node and relative to the other child nodes.

9. The method as claimed in claim 1 wherein the grandchild nodes within the target child node transversally grow proportionally with the target child node.

10. The method as claimed in claim 9 wherein enlarging of the area of the target child node relative to the other child nodes results in the grandchild nodes surrounding the central node to an increasing extent.

11. The method as claimed in claim 10 wherein the grandchild nodes spawn from an outer perimeter of the ring segment and progressively fill the ring segment in the direction of the central node such that, once the pointer has crossed the selection threshold, the grandchild nodes have completely filled the ring segment.

12. The method as claimed in claim 1 wherein the pointer remains at a center point of the central node, the node set moves along with the pointer as the pointer is moved, and the anchor point and the selection threshold remains stationary as the pointer is moved within the bounds of the selection threshold and update once the selection threshold is crossed.

13. A user interface for an electronic device comprising:
a processor configured to execute computer program code including one or more components that include a series of instructions stored on a non-transitory computer readable medium, the one or more components including:
a display component for displaying a node set, the node set including a central node and a plurality of child nodes arranged around the central node, the central node representing a parent associated with a first level of a tree structure and the child nodes representing children of the parent associated with a second level of the tree structure, wherein the central node is associated with a first anchor point which is bound by a first selection threshold;
an input receiving component for receiving user input;
a tracking component for tracking the movement or a position of a pointer in relation to the anchor point; and
a rendering and adapting component for, during a continuous motion of the pointer which commences in the central node and is directed towards a target child node, as the pointer is moved closer to the first selection threshold, rendering and progressively enlarging grandchild nodes within the target child node such that the grandchild nodes progressively fill the area of the target child node, the grandchild nodes representing children of the target child node associated with a third level of the tree structure, and concurrently progressively enlarging the area of the target child node around the central node relative to other child nodes such that, once the pointer has crossed the first selection threshold and a threshold point is created at the point of crossing the first selection threshold, the grandchild nodes have completely filled the area of the target child node, the central node being surrounded by the grandchild nodes so as to represent the target child node, the central node at the time of crossing becoming associated with a second anchor point defined by the threshold point and which is bound by a second selection threshold for further continuous navigation of the tree structure through movement of the pointer towards the second selection threshold.

14. A user interface as claimed in claim 13 which includes an exit node component for rendering an exit node in the node set.

15. A user interface as claimed in claim 13 wherein the rendering and adapting component is further configured for, during a continuous motion of the pointer which commences in the central node and is directed towards the exit node, as the pointer is moved closer to the second selection threshold, rendering and progressively enlarging child nodes within the exit node such that the child nodes progressively fill the area of the exit node, and concurrently progressively enlarging the area of the exit node around the central node relative to the grandchild nodes such that, once the pointer has crossed the second selection threshold at a threshold point, the child nodes have completely filled the area of the exit node, the central node being surrounded by the child nodes so as to represent the parent, the central node at the time of crossing becoming associated with a third anchor point defined by the threshold point and which is bound by a third selection threshold for further continuous navigation of the tree structure.

16. A user interface as claimed in claim 13 which includes a repositioning component for providing a repositioning mode associated with a second mode of movement of the pointer and wherein the repositioning component is configured to, responsive to detecting movement of the pointer in the second mode, reposition the entire node set as a function of the pointer movement in the second mode.

* * * * *